(No Model.)
E. WOOLDRIDGE.
POTATO PLANTER.
No. 453,228. Patented June 2, 1891.
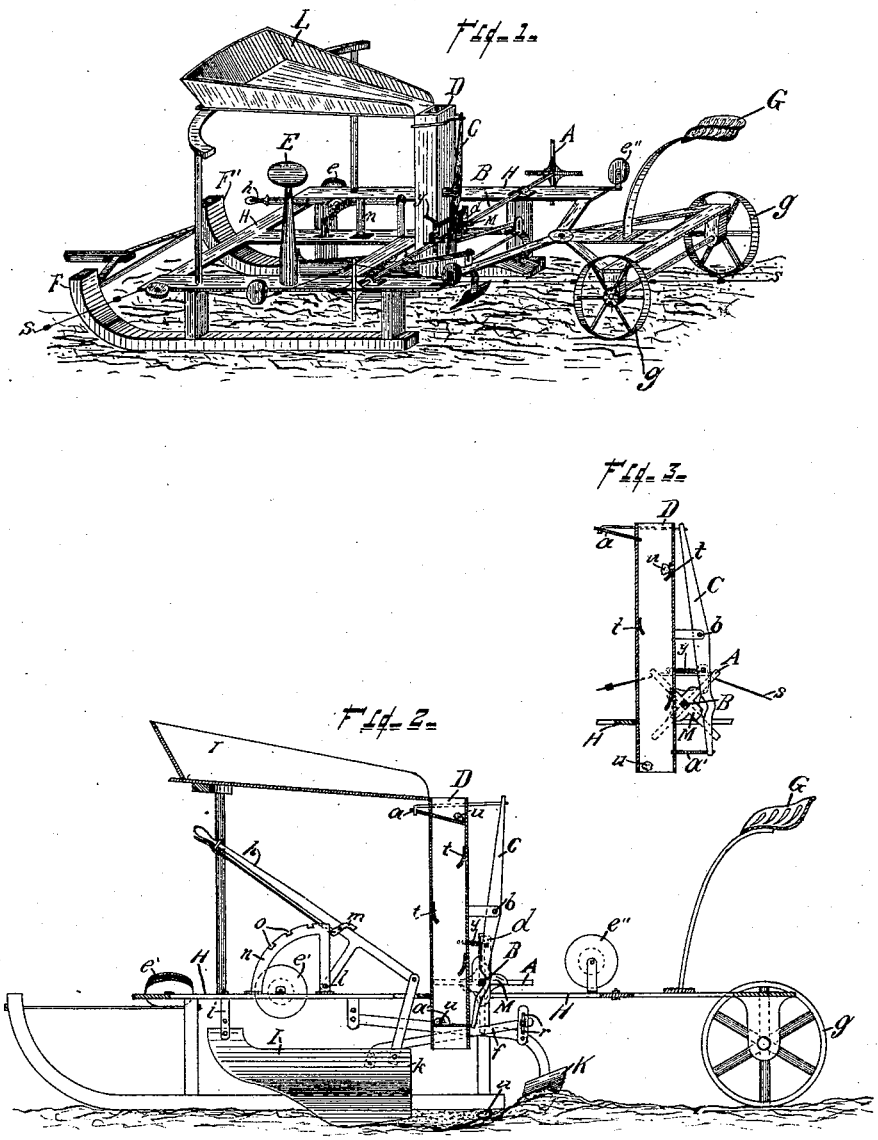

UNITED STATES PATENT OFFICE.

EZRA WOOLDRIDGE, OF LONG LAKE, ILLINOIS.

POTATO-PLANTER.

SPECIFICATION forming part of Letters Patent No. 453,228, dated June 2, 1891.

Application filed May 21, 1890. Serial No. 352,679. (No model.)

*To all whom it may concern:*

Be it known that I, EZRA WOOLDRIDGE, a citizen of the United States, residing at Long Lake, in the county of Madison and State of Illinois, have invented certain new and useful Improvements in Potato-Planters, of which the following is a full, clear, and exact description.

My invention relates to that class of farming implements which are used to automatically or otherwise put seed into fallow ground in a furrow made by a ditching or furrow plow attached to the planter, and to which, also, is attached the means of covering the seed; and it consists in features of novelty hereinafter described.

The object of my invention is to provide a potato-planter so constructed and operated as to be capable of either planting the seed-potatoes at definitely-regular intervals, so that the plant-rows can be cultivated in either direction, or drilling it in rows, and, further, one that will do the work well and positively irrespective of the size of the seed. How I accomplish these objects will be made plain by the following description and specification of the essential features and operation of my invention, reference being had to the accompanying drawings, in which like letters of reference denote like parts in the several figures.

Figure 1 is a perspective view of my planter as in practical operation. Fig. 2 is a sectional elevation of the same, taken from front to back on a line through the center of the planter. Fig. 3 is a sectional view, taken as in Fig. 2, of the dropping attachment, showing it open as in the act of dropping a seed.

I preferably mount my apparatus on the sled-runners F F', which are of the distance apart equal to the desired distance between plant-rows and the planting attachment mounted midway between them, so that the track of the outside runner may be used as a marker for the inside track of the next row.

To the frame-work H of the planter, at a convenient position, I attach the seat E for the assistant or boy. To relieve the planter proper of the weight of the driver, I preferably mount his seat G on an independent frame-work supported by two wheels $g$ $g$ and secured to the frame-work of the planter by a double-hinged joint in such manner that it will follow the planter properly in turning and on uneven ground.

Underneath the frame-work H of the planter is the two-sided ditching or furrow plow I, secured to the frame-work at its front or nose end by a joint $i$ in such manner as to allow the plow to assume different depths relative to the position of the supporting-runners F F', but to always be in a line parallel to the same. Secured to H, with its lower end opening resting immediately behind the back divided end $k$ of the furrow-plow, is the seed-chute D. Secured to the frame-work H and to the upper end of the chute D is the hopper L, with its narrow opening leading to the opening in the upper end of the seed-chute. The opening in the seed-chute is normally closed by two flat gates $a$ $a'$, sliding in grooves cut in the sides of the seed-chute and placed, respectively, near the upper and lower ends of the chute. These two gates are attached to and controlled by the two ends of a lever C, which is fulcrumed midway in its length on a pivot-bolt $b$, attached to the body of the chute D. At a convenient distance from the fulcrum-point two projections or lugs $d$ are attached to the upper arm of the lever C. These lugs fit into and are operated by the two four-leafed cams M, which are placed in position and at a distance apart convenient to engage the lugs $d$ on a shaft B. Except at the instant when being actuated by the opening-cams M, the gates are closed and held so by the coil-spring $y$, which is attached by one of its ends to the lever C at some convenient point and by the other end to the body of the seed-chute D. The shaft B is placed across and secured to the frame-work of the planter, with its ends projecting beyond the sides of same. On each end of the shaft B a sprocket or forked wheel A is fastened.

On each side of the planter are secured to the frame-work one or more grooved guide pulleys or sheaves $e$ $e'$ $e''$ to properly lead or guide the check-wire $s$ to the sprocket-wheels.

Attached to and underneath the planter are two covering-plows K, so placed and secured that they shall follow on either side of the track of the furrow-plow, with their shares so shaped and directed as to cover the seed when it is dropped into the furrow. The furrow-plow I, and along with it the covering-plows K, by means of the extension-arms $f$, is raised out of the ground, as necessary in turning, by the hand-lever $h$, secured to the frame-work of the planter by a hinge-joint $l$. This lever-handle can be locked in a definite position by the spring-governed pawl $m$, engaging the frame $n$ in one of the several notches $o$ cut in the edge of the same. The depth of the furrow is governed by raising or lowering the lead given to the furrow-plow, or it may be done by extending the frame $n$ and cutting extra notches for the pawl $m$ and the plow forced to the proper depth by the lever $h$. The distance between the covering-shovels K is adjustable, and the slots $r$ in the ends of the raising-arms $f$ permit them to assume different depths relative to the depth of the furrow-plow.

In practice, the check-wire $s$ having been stretched across the field and secured at each end and the planter being in place, the wire is run through the guide-pulleys $e$, $e'$, and $e''$ and over the inside of one of the sprocket-wheels A. As the machine is drawn forward, the buttons, as they pass, engage the sprocket-wheel and turn it, along with the cams, on the shaft B one-quarter of a revolution. In doing this the gates $a$ and $a'$ are opened, and the seed-potato, placed on $a$ by an assisting boy, is dropped to $a'$. The opening and closing of the gates is quick, and the direct fall of the potato being more or less hindered or retarded by the inclined offsetting pieces $t$, secured to the inside of the seed-chute. When the sprocket-wheels are again turned a quarter of a turn, and with them the two actuating-cams, which again opens the gates, the potato that was supported on $a'$ is allowed to drop into the furrow and another to drop from $a$ to $a'$. The object of having two gates is to have one in a convenient position to the assistant and the one from which the seed is dropped into the furrow as short a distance from the ground as is possible, so that the drop from the gate will be short and the seed put into the ground at a point practically immediately under the position of the machine when the gate is opened—that is, uninfluenced by the motion of the machine. The position of the two guide-wheels $e'$ and $e''$ is adjustable, so as to properly lead the check-wire to and take it from the sprocket-wheels, in order that the buttons on the check-wire shall engage and leave the sprocket-wheels in the proper position to operate the cams M.

It is obvious from the description that I can make a double planter or one that will plant two rows at the same time; also, that the same can be mounted on wheels as well as on runners, if desirable, without departing from the essential features of my invention, and, further, that while the lower gate $a'$ is the essential one for placing the seed at the proper place, yet it is preferable in practice to make use of the second upper one $a$.

When it is desirable to plant the seed at intervals more frequent than is possible with the check-wire or to drill the seed, the automatic dropping attachment can be dispensed with and the gates $a$ $a'$ removed and the seed simply fed from the hopper L directly down the seed-chute D.

I claim—

1. In a potato-planter, the combination, with the seed-chute, of two normally-closed gates and mechanism for simultaneously opening and closing said gates, substantially as and for the purposes described.

2. In a potato-planter, the combination, with the furrow-opener and furrow-closer, of a seed-chute having spring-actuated gates at its top and bottom, a lever connecting the gates to simultaneously open the same, and means for actuating the lever and gates, substantially as and for the purposes described.

3. In a potato-planter, the combination, with the furrow-opener and furrow-closer, of a seed-chute having gates at its upper and lower ends, springs for normally holding the gates in a closed position, a lever pivoted to the chute and connecting the gates for simultaneously opening the same, a cam for operating the lever, and a forked sprocket-wheel adapted to engage with a check-wire, substantially as and for the purposes described.

4. In a potato-planter, the combination, with the frame, of a furrow-opener and furrow-closer pivotally and adjustably mounted on the same, a seed-chute interposed between the furrow opener and closer, spring-actuated gates in the chute, and means for engaging a check-wire and actuating the gates therefrom, substantially as and for the purposes described.

5. In a potato-planter, the combination, with a furrow-opener and furrow-closer adjustably mounted on the frame, of a feed-chute having upper and lower gates, a pivoted lever connected at its opposite ends with said gates, a cam for actuating said lever to simultaneously open the gates, a spring for closing said gates inclined in said chute for retarding the passage of the seed, and a check-wire having buttons which actuate the cam, substantially as and for the purposes described.

6. In a potato-planter, the combination of a suitable frame-work properly mounted, a driver's seat, a seat for assistant conveniently placed, a furrow-plow secured to the frame-work of the planter in such manner as to make the furrow for the seed the proper depth, adjustable covering-plows, a seed-supply hopper, a seed-chute normally closed by a gate or gates, cams and sprocket-wheels for operating chute-gates, a check-wire to turn the said sprocket-wheels, guide-wheels to properly lead the check-wire to sprocket-wheels, and a lever with extended arms for raising said plows out of the ground, substantially as described, and for the purposes specified.

7. In a potato-planter, the combination, with the seed-chute, of gates at the upper and lower ends thereof, means for opening the gates simultaneously, and deflectors in the chute between the gates for retarding the fall of the seed, substantially as and for the purposes described.

In testimony whereof I have affixed my signature, in presence of two witnesses, this 8th day of April, 1890.

EZRA WOOLDRIDGE.

Witnesses:
JOS. W. CROOKES,
A. RAMES.